US012757129B2

(12) United States Patent
Gürsu et al.

(10) Patent No.: US 12,757,129 B2
(45) Date of Patent: Oct. 6, 2026

(54) METHOD, APPARATUS AND COMPUTER PROGRAM TO ADJUST POWER ALLOCATED TO A TRANSMITTER

(71) Applicant: Nokia Technologies Oy, Espoo (FI)

(72) Inventors: Halit Murat Gürsu, Munich (DE); Samantha Caporal Del Barrio, Aalborg (DK); Ahmad Awada, Munich (DE); Ingo Viering, Munich (DE); Karri Markus Ranta-Aho, Espoo (FI); Kyoungmin Park, Seoul (KR); Panagiotis Spapis, Munich (DE); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 266 days.

(21) Appl. No.: 18/555,172

(22) PCT Filed: May 17, 2021

(86) PCT No.: PCT/EP2021/062963
§ 371 (c)(1),
(2) Date: Oct. 12, 2023

(87) PCT Pub. No.: WO2022/242822
PCT Pub. Date: Nov. 24, 2022

(65) Prior Publication Data
US 2024/0205845 A1 Jun. 20, 2024

(51) Int. Cl.
*H04W 52/36* (2009.01)

(52) U.S. Cl.
CPC .................................. *H04W 52/367* (2013.01)

(58) Field of Classification Search
CPC ............. H04W 52/367; H04W 52/146; H04W 52/346; H04W 52/16; H04W 52/281;
(Continued)

(56) References Cited

U.S. PATENT DOCUMENTS

2011/0319119 A1* 12/2011 Ishii .................... H04W 52/367 455/522
2013/0178167 A1 7/2013 Lockerbie et al.
(Continued)

FOREIGN PATENT DOCUMENTS

| | | | |
|---|---|---|---|
| WO | 2020/032866 | A1 | 2/2020 |
| WO | 2020/086209 | A1 | 4/2020 |
| WO | 2020/088777 | A1 | 5/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

(Continued)

*Primary Examiner* — Lester G Kincaid
(74) *Attorney, Agent, or Firm* — Lippes Mathias LLP

(57) ABSTRACT

There is provided an apparatus comprising means for: receiving, at a user equipment comprising a first transmitter and a second transmitter, a plurality of power sharing configurations, wherein a power sharing configuration indicates a power allocation to be applied to the first and second transmitters when a maximum permissible exposure event is detected; detecting a maximum permissible exposure event associated with at least one of the first transmitter and the second transmitter; and adjusting the power allocated to the first transmitter and the second transmitter based on the power sharing configuration and the detected maximum permissible exposure event.

19 Claims, 5 Drawing Sheets

(58) Field of Classification Search
CPC ..... H04W 52/30; H04W 52/34; H04W 52/38; H04W 52/365; H04W 72/21; H04W 72/0473; H04B 1/3838; H04B 7/024; H04B 7/0404; H04B 7/0408; H04B 17/328
See application file for complete search history.

(56) References Cited

U.S. PATENT DOCUMENTS

| | | | | |
|---|---|---|---|---|
| 2019/0313348 | A1* | 10/2019 | MolavianJazi | H04W 52/281 |
| 2019/0387440 | A1 | 12/2019 | Ylu et al. | |
| 2020/0120611 | A1 | 4/2020 | Lim et al. | |
| 2020/0411960 | A1* | 12/2020 | Ng | G01S 13/582 |
| 2021/0136702 | A1* | 5/2021 | Wang | H04W 52/30 |
| 2022/0007308 | A1* | 1/2022 | Xiong | H04W 52/38 |
| 2022/0361086 | A1* | 11/2022 | Wang | H04W 40/12 |
| 2023/0029850 | A1* | 2/2023 | Park | H04W 72/1268 |
| 2023/0035862 | A1* | 2/2023 | Yuan | H04W 72/23 |
| 2023/0065671 | A1* | 3/2023 | Yuan | H04W 52/242 |
| 2024/0195479 | A1* | 6/2024 | Liu | H04B 7/0691 |

OTHER PUBLICATIONS

"3rd Generation Partnership Project; Technical Specification Group Radio Access Network; NR; Physical layer procedures for control (Release 15)", 3GPP TS 38.213, V15.7.0, Sep. 2019, pp. 1-108.

"Introduction of the P-MPR 2 bits report mapping in 38.133", 3GPP TSG-RAN WG4 Meeting #96-e, R4-2011736, InterDigital Inc, Aug. 17-28, 2020, 2 pages.

"Introduction of MPE related P-MPR operation in sub-clause 6.2.4", 3GPP TSG-RAN WG4 Meeting #96-e, R4-2011735, InterDigital Inc, Aug. 17-28, 2020, 3 pages.

"Introduction of MPE reporting", 3GPP RAN WG2 Meeting #111-e, R2-2008595, InterDigital, Aug. 17-28, 2020, 6 pages.

"Introduction of MPE reporting", 3GPP RAN WG2 Meeting #111-e, R2-2008570, InterDigital, Aug. 17-28, 2020, 9 pages.

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.0.0, Dec. 2020, pp. 1-488.

Moein et al., "Power Allocation in Dual Connectivity Networks Based on Actor-Critic Deep Reinforcement Learning", International Symposium on Modeling and Optimization in Mobile, Ad Hoc, and Wireless Networks (WiOPT), Jun. 3-7, 2019, 8 pages.

Jha et al., "Dual Connectivity in LTE small cell networks", IEEE Globecom Workshops (GC Wkshps), Dec. 8-12, 2014, pp. 1205-1210.

"3rd Generation Partnership Project; Technical Specification Group Radio Access Network; NR; Requirements for support of radio resource management (Release 17)", 3GPP TS 38.133, V17.1.0, Mar. 2021, 2172 pages.

International Search Report and Written Opinion received for corresponding Patent Cooperation Treaty Application No. PCT/EP2021/062963, dated Feb. 24, 2022, 15 pages,.

"On FR2 inter-band UL CA for different frequency group based on IBM", 3GPP TSG-WG RAN4 Meeting #99e, R4-2109788, Agenda: 9.4.2.2.1, Nokia, May 19-28, 2021, 27 pages.

* cited by examiner

METHOD, APPARATUS AND COMPUTER PROGRAM TO ADJUST POWER ALLOCATED TO A TRANSMITTER

RELATED APPLICATION

This application was originally filed as a Patent Cooperation Treaty Application No. PCT/EP2021/062963 filed on May 17, 2021, which is hereby incorporated in its entirety.

FIELD

The present application relates to a method, apparatus, and computer program and in particular but not exclusively to adjusting power allocated to a transmitter.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: receiving, at a user equipment comprising a first transmitter and a second transmitter, a plurality of power sharing configurations, wherein a power sharing configuration indicates a power allocation to be applied to the first and second transmitters when a maximum permissible exposure event is detected; detecting a maximum permissible exposure event associated with at least one of the first transmitter and the second transmitter; and adjusting the power allocated to the first transmitter and the second transmitter based on the power sharing configuration and the detected maximum permissible exposure event.

Detecting the maximum permissible exposure event may comprise detecting a proximity of human tissue to the transmitter.

Adjusting the power allocated may comprise decreasing the power allocated to the transmitter with which the maximum permissible exposure event is associated.

At least one of the power sharing configurations may comprise a value indicating an amount to decrease the power allocated to the transmitter with which the maximum permissible exposure event is associated to when the maximum permissible exposure event is detected.

Adjusting the power allocated may comprise increasing the power allocated to at least one transmitter with which the maximum permissible exposure event is not associated.

At least one of the power sharing configurations may indicate a second difference value indicating an amount to increase the power allocated to the at least one transmitter with which the maximum permissible exposure event is not associated when the maximum permissible exposure event is detected.

The first difference value and/or the second difference value may be zero.

Adjusting the power allocated may comprise adjusting a duty cycle of the transmitter with which the maximum permissible exposure event is associated.

Adjusting the power allocated may comprise adjusting a duty cycle of at least one transmitter with which the maximum permissible exposure event is not associated.

There may be a plurality of maximum permissible exposure event levels, and wherein the power allocation to be applied to the first transmitter and the second transmitter may be dependent on the level of the maximum permissible exposure event.

The user equipment may have a maximum power threshold, and wherein the sum of the power allocated to the first transmitter and the power allocated to the second transmitter may not exceed the maximum power threshold.

The means may be for: receiving an updated power sharing configuration; and re-adjusting the power allocated to the first transmitter and the second transmitter based on the updated power sharing configuration.

The first transmitter may be in communication with a source cell and the second transmitter may be in communication with a target cell.

The first transmitter may be in communication with a primary cell and the second transmitter may be in communication with a secondary cell.

According to an aspect, there is provided an apparatus comprising means for: transmitting, to a user equipment comprising a first transmitter and a second transmitter, a plurality of power sharing configurations, wherein a power sharing configuration indicates a power allocation to be applied to the first and second transmitters when a maximum permissible exposure event is detected.

The means may be for: determining the plurality of power sharing configurations, wherein the determining comprises determining the power allocation and associating the maximum permissible exposure event with the power allocation.

The means may be for: receiving, from the user equipment, a user equipment capability report, wherein the transmitting the plurality of power sharing configurations is based on the user equipment capability report.

Transmitting the plurality of power sharing configurations may be dependent on a determination of whether at least one uplink slot for a network associated with the first transmitter of the user equipment is the same as or overlaps at least one uplink slot for a network associated with the second transmitter of the user equipment.

The means may be for: determining that the user equipment has entered a multi-connectivity mode of operation, where the first transmitter is in communication with a first network node and the second transmitter is in communication with a second network node, wherein the transmitting is performed in response to the determining that the user equipment has entered a multi-connectivity mode of operation.

According to an aspect, there is provided an apparatus comprising at least one processor and at least one memory including a computer program code, the at least one memory and computer program code configured to, with the at least one processor, cause the apparatus at least to: receive, at a user equipment comprising a first transmitter and a second transmitter, a plurality of power sharing configurations, wherein a power sharing configuration indicates a power allocation to be applied to the first and second transmitters when a maximum permissible exposure event is detected; detect a maximum permissible exposure event associated with at least one of the first transmitter and the second transmitter; and adjust the power allocated to the first transmitter and the second transmitter based on the power sharing configuration and the detected maximum permissible exposure event.

Detecting the maximum permissible exposure event may comprise detecting a proximity of human tissue to the transmitter.

Adjusting the power allocated may comprise decreasing the power allocated to the transmitter with which the maximum permissible exposure event is associated.

At least one of the power sharing configurations may comprise a value indicating an amount to decrease the power allocated to the transmitter with which the maximum permissible exposure event is associated to when the maximum permissible exposure event is detected.

Adjusting the power allocated may comprise increasing the power allocated to at least one transmitter with which the maximum permissible exposure event is not associated.

At least one of the power sharing configurations may indicate a second difference value indicating an amount to increase the power allocated to the at least one transmitter with which the maximum permissible exposure event is not associated when the maximum permissible exposure event is detected.

The first difference value and/or the second difference value may be zero.

Adjusting the power allocated may comprise adjusting a duty cycle of the transmitter with which the maximum permissible exposure event is associated.

Adjusting the power allocated may comprise adjusting a duty cycle of at least one transmitter with which the maximum permissible exposure event is not associated.

There may be a plurality of maximum permissible exposure event levels, and wherein the power allocation to be applied to the first transmitter and the second transmitter may be dependent on the level of the maximum permissible exposure event.

The user equipment may have a maximum power threshold, and wherein the sum of the power allocated to the first transmitter and the power allocated to the second transmitter may not exceed the maximum power threshold.

The at least one memory and at least one processor may be configured to cause the apparatus to: receive an updated power sharing configuration; and re-adjust the power allocated to the first transmitter and the second transmitter based on the updated power sharing configuration.

The first transmitter may be in communication with a source cell and the second transmitter may be in communication with a target cell.

The first transmitter may be in communication with a primary cell and the second transmitter may be in communication with a secondary cell.

According to an aspect, there is provided an apparatus comprising at least one processor and at least one memory including a computer program code, the at least one memory and computer program code configured to, with the at least one processor, cause the apparatus at least to: transmit, to a user equipment comprising a first transmitter and a second transmitter, a plurality of power sharing configurations, wherein a power sharing configuration indicates a power allocation to be applied to the first and second transmitters when a maximum permissible exposure event is detected.

The at least one memory and at least one processor may be configured to cause the apparatus to: determine the plurality of power sharing configurations, wherein the at least one memory and at least one processor may be configured to cause the apparatus to determine the power allocation and associate the maximum permissible exposure event with the power allocation.

The at least one memory and at least one processor may be configured to cause the apparatus to: receive, from the user equipment, a user equipment capability report, wherein the at least one memory and at least one processor may be configured to cause the apparatus to transmit the plurality of power sharing configurations based on the user equipment capability report.

The at least one memory and at least one processor may be configured to cause the apparatus to transmit the plurality of power sharing configurations dependent on a determination of whether at least one uplink slot for a network associated with the first transmitter of the user equipment is the same as or overlaps at least one uplink slot for a network associated with the second transmitter of the user equipment.

The at least one memory and at least one processor may be configured to cause the apparatus to: determine that the user equipment has entered a multi-connectivity mode of operation, where the first transmitter is in communication with a first network node and the second transmitter is in communication with a second network node, wherein the at least one memory and at least one processor may be configured to cause the apparatus to transmit the plurality of power sharing configurations in response to the determination that the user equipment has entered a multi-connectivity mode of operation.

According to an aspect, there is provided a method comprising: receiving, at a user equipment comprising a first transmitter and a second transmitter, a plurality of power sharing configurations, wherein a power sharing configuration indicates a power allocation to be applied to the first and second transmitters when a maximum permissible exposure event is detected; detecting a maximum permissible exposure event associated with at least one of the first transmitter and the second transmitter; and adjusting the power allocated to the first transmitter and the second transmitter based on the power sharing configuration and the detected maximum permissible exposure event.

Detecting the maximum permissible exposure event may comprise detecting a proximity of human tissue to the transmitter.

Adjusting the power allocated may comprise decreasing the power allocated to the transmitter with which the maximum permissible exposure event is associated.

At least one of the power sharing configurations may comprise a value indicating an amount to decrease the power allocated to the transmitter with which the maximum permissible exposure event is associated to when the maximum permissible exposure event is detected.

Adjusting the power allocated may comprise increasing the power allocated to at least one transmitter with which the maximum permissible exposure event is not associated.

At least one of the power sharing configurations may indicate a second difference value indicating an amount to increase the power allocated to the at least one transmitter with which the maximum permissible exposure event is not associated when the maximum permissible exposure event is detected.

The first difference value and/or the second difference value may be zero.

Adjusting the power allocated may comprise adjusting a duty cycle of the transmitter with which the maximum permissible exposure event is associated.

Adjusting the power allocated may comprise adjusting a duty cycle of at least one transmitter with which the maximum permissible exposure event is not associated.

There may be a plurality of maximum permissible exposure event levels, and wherein the power allocation to be applied to the first transmitter and the second transmitter may be dependent on the level of the maximum permissible exposure event.

The user equipment may have a maximum power threshold, and wherein the sum of the power allocated to the first transmitter and the power allocated to the second transmitter may not exceed the maximum power threshold.

The method may comprise: receiving an updated power sharing configuration; and re-adjusting the power allocated to the first transmitter and the second transmitter based on the updated power sharing configuration.

The first transmitter may be in communication with a source cell and the second transmitter may be in communication with a target cell.

The first transmitter may be in communication with a primary cell and the second transmitter may be in communication with a secondary cell.

According to an aspect, there is provided a method comprising: transmitting, to a user equipment comprising a first transmitter and a second transmitter, a plurality of power sharing configurations, wherein a power sharing configuration indicates a power allocation to be applied to the first and second transmitters when a maximum permissible exposure event is detected.

The method may comprise: determining the plurality of power sharing configurations, wherein the determining comprises determining the power allocation and associating the maximum permissible exposure event with the power allocation.

The method may comprise: receiving, from the user equipment, a user equipment capability report, wherein the transmitting the plurality of power sharing configurations is based on the user equipment capability report.

Transmitting the plurality of power sharing configurations may be dependent on a determination of whether at least one uplink slot for a network associated with the first transmitter of the user equipment is the same as or overlaps at least one uplink slot for a network associated with the second transmitter of the user equipment.

The method may comprise: determining that the user equipment has entered a multi-connectivity mode of operation, where the first transmitter is in communication with a first network node and the second transmitter is in communication with a second network node, wherein the transmitting is performed in response to the determining that the user equipment has entered a multi-connectivity mode of operation.

According to an aspect, there is provided a computer readable medium comprising program instructions for causing an apparatus to perform at least the following: receiving, at a user equipment comprising a first transmitter and a second transmitter, a plurality of power sharing configurations, wherein a power sharing configuration indicates a power allocation to be applied to the first and second transmitters when a maximum permissible exposure event is detected; detecting a maximum permissible exposure event associated with at least one of the first transmitter and the second transmitter; and adjusting the power allocated to the first transmitter and the second transmitter based on the power sharing configuration and the detected maximum permissible exposure event.

Detecting the maximum permissible exposure event may comprise detecting a proximity of human tissue to the transmitter.

Adjusting the power allocated may comprise decreasing the power allocated to the transmitter with which the maximum permissible exposure event is associated.

At least one of the power sharing configurations may comprise a value indicating an amount to decrease the power allocated to the transmitter with which the maximum permissible exposure event is associated to when the maximum permissible exposure event is detected.

Adjusting the power allocated may comprise increasing the power allocated to at least one transmitter with which the maximum permissible exposure event is not associated.

At least one of the power sharing configurations may indicate a second difference value indicating an amount to increase the power allocated to the at least one transmitter with which the maximum permissible exposure event is not associated when the maximum permissible exposure event is detected.

The first difference value and/or the second difference value may be zero.

Adjusting the power allocated may comprise adjusting a duty cycle of the transmitter with which the maximum permissible exposure event is associated.

Adjusting the power allocated may comprise adjusting a duty cycle of at least one transmitter with which the maximum permissible exposure event is not associated.

There may be a plurality of maximum permissible exposure event levels, and wherein the power allocation to be applied to the first transmitter and the second transmitter may be dependent on the level of the maximum permissible exposure event.

The user equipment may have a maximum power threshold, and wherein the sum of the power allocated to the first transmitter and the power allocated to the second transmitter may not exceed the maximum power threshold.

The apparatus may be caused to perform: receiving an updated power sharing configuration; and re-adjusting the power allocated to the first transmitter and the second transmitter based on the updated power sharing configuration.

The first transmitter may be in communication with a source cell and the second transmitter may be in communication with a target cell.

The first transmitter may be in communication with a primary cell and the second transmitter may be in communication with a secondary cell.

According to an aspect, there is provided a computer readable medium comprising program instructions for causing an apparatus to perform at least the following: transmitting, to a user equipment comprising a first transmitter and a second transmitter, a plurality of power sharing configurations, wherein a power sharing configuration indicates a power allocation to be applied to the first and second transmitters when a maximum permissible exposure event is detected.

The apparatus may be caused to perform: determining the plurality of power sharing configurations, wherein the determining comprises determining the power allocation and associating the maximum permissible exposure event with the power allocation.

The apparatus may be caused to perform: receiving, from the user equipment, a user equipment capability report, wherein the transmitting the plurality of power sharing configurations is based on the user equipment capability report.

Transmitting the plurality of power sharing configurations may be dependent on a determination of whether at least one uplink slot for a network associated with the first transmitter of the user equipment is the same as or overlaps at least one uplink slot for a network associated with the second transmitter of the user equipment.

The apparatus may be caused to perform: determining that the user equipment has entered a multi-connectivity mode of operation, where the first transmitter is in communication with a first network node and the second transmitter is in communication with a second network node, wherein the transmitting is performed in response to the determining that the user equipment has entered a multi-connectivity mode of operation.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
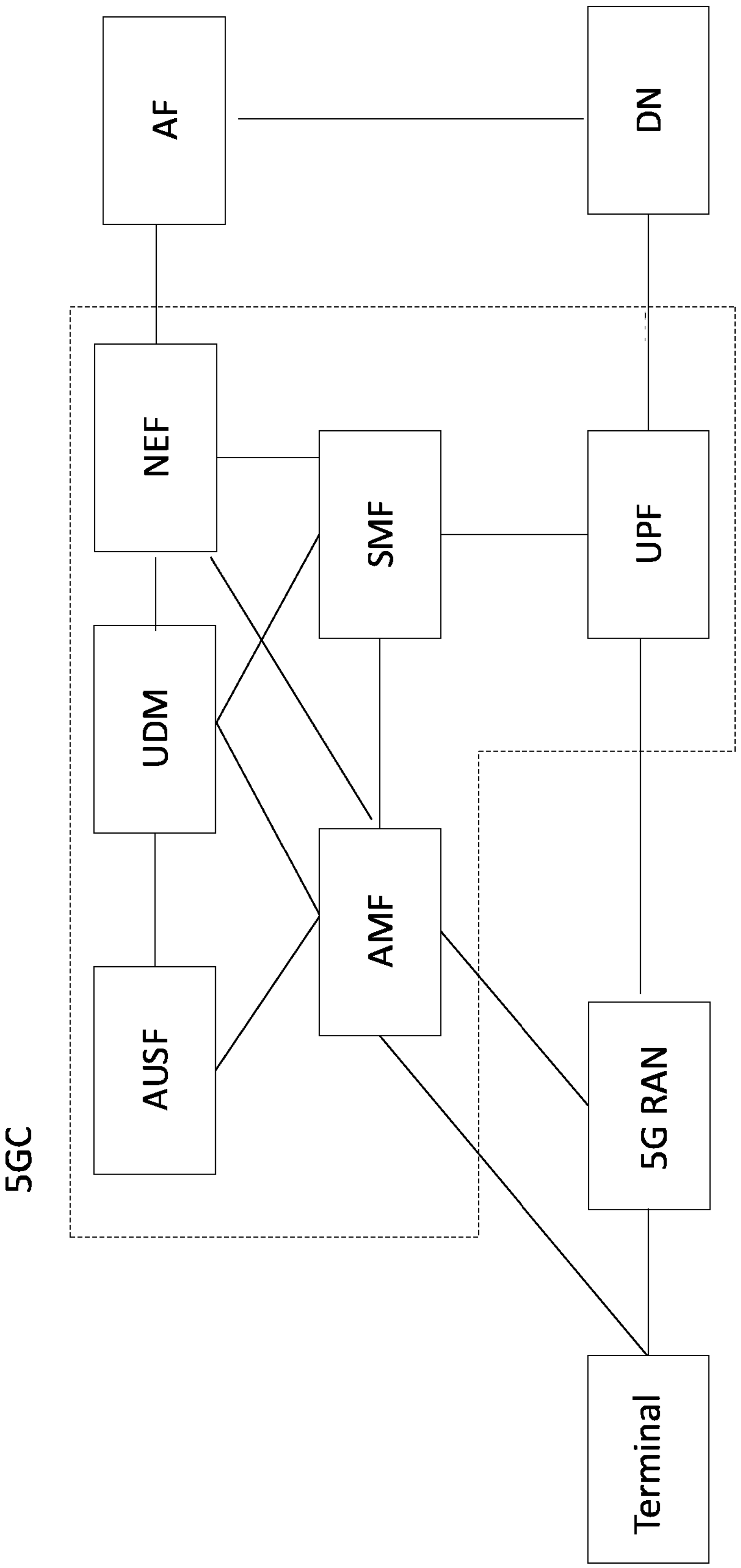
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
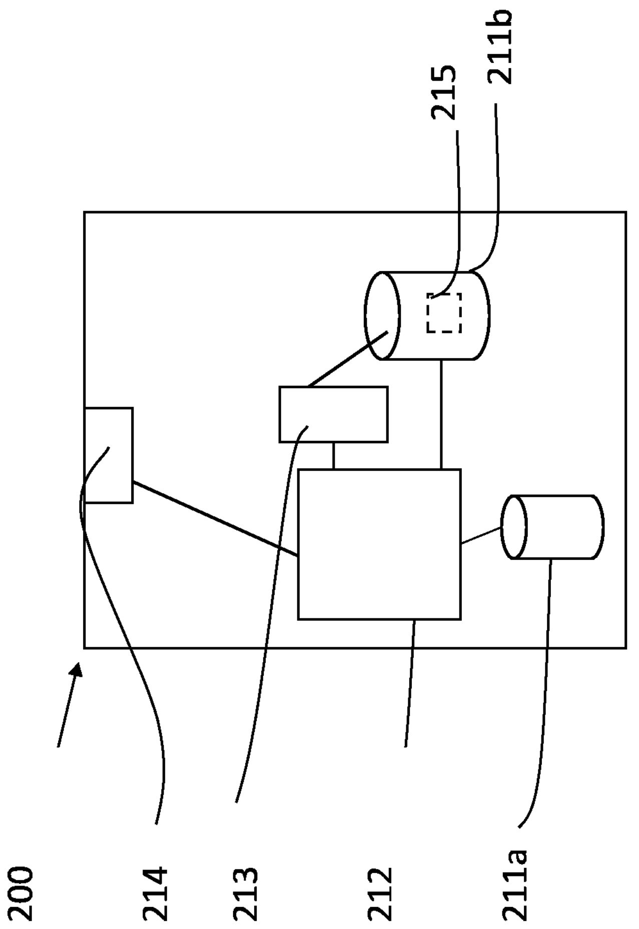
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
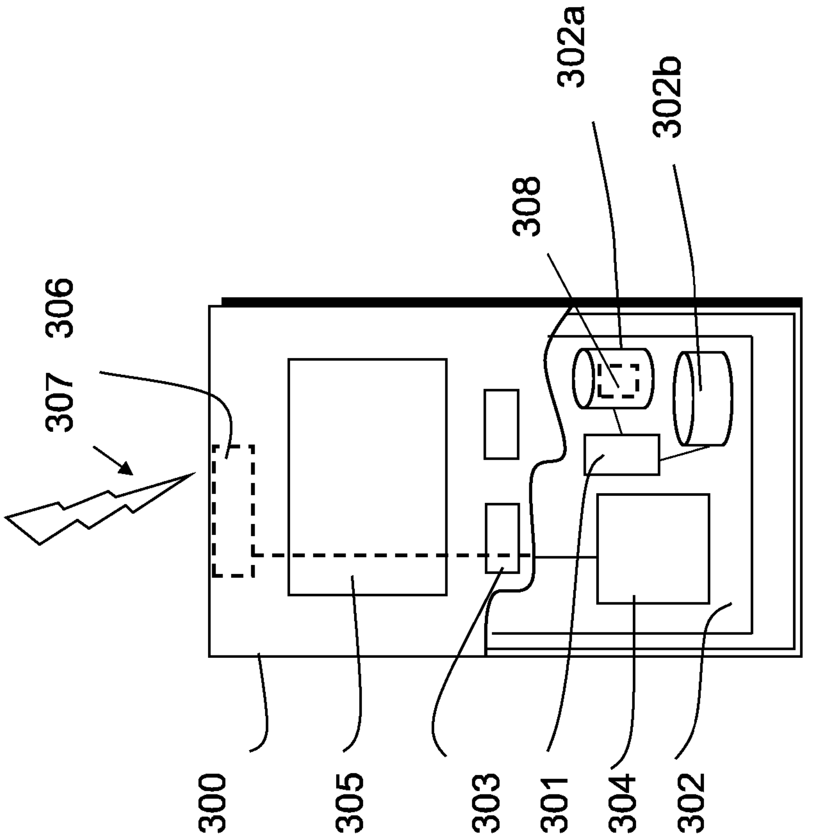
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 311*a* and the ROM 311*b*. The at least one processor 301 may be configured to execute an appropriate software code 308. The software code 308 may for example allow to perform one or more of the present aspects. The software code 308 may be stored in the ROM 311*b*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In some examples, the maximum power amplifier (PA) output power of a user equipment (UE) may be limited, for example as defined in TS 38.101. In such examples, the UE may not be allowed to output more than a maximum specified power level. Limited power outputs are also discussed further below.

In the case where the UE is outputting from two or more transmitters (also referred to herein as antennas, antenna panels, or panels), and the two or more antennas support power sharing, the maximum specified power level may have to be shared between antennas. If the UE does not support power sharing, the UE may have to prioritize one link over another.

In some examples, a UE may be operating in a dual connectivity (DC) mode or performing a dual active protocol stack (DAPS) handover. In the case of DC, the UE may have one antenna for connection to a primary cell, and another antenna for connection to a secondary cell. In the case of DAPS handover, the UE may have one antenna for connection to a serving/source cell, and another antenna for connection to a target cell.

The UE may obtain a parameter which defines the maximum power for cells involved in DC and/or DAPS. In DC, each cell group (primary and secondary) may be provided with a maximum uplink transmit power. For example, the parameter p-NR-FR1 may define the maximum uplink transmit power for cell groups in frequency range (FR) 1, and p-NR-FR2 for cell groups in FR2. In DAPS, the parameter p-DAPS-Source-r16 and p-DAPS-Target-r16 may define respectively the maximum uplink transmit power to the source and target cells.

In some cases of DAPS implementation, the UE may be expected to release the connection to the source cell once handover to the target cell has been performed. However, if the UE maintains connection to the source cell for a period after establishing connection to the target cell (for example to ensure the connection to the target cell is stable), the UE may have an uplink connection with the target cell in the control plane and user plane, and have another uplink connection with the source cell in the control plane. Such implementation may require power sharing between the UE antennas.

As mentioned above, there are some instances in which a transmitter has a limited output power. For example, in some countries, guidelines are in place to limit potential health issues due to thermal effects of over-exposure to millimetre wavelength (mmWave) transmissions. A maximum permissible exposure (MPE) defines a regulated power density for the mmWave regime, which for example the Federal Communications Commission (FCC) sets at 10 $W/m^2$ (1 $mW/cm^2$). For certain distances separating human tissue and the antenna, power back-off (PBO) is required for FCC compliance with MPE.

In order to comply with MPE regulation(s), a UE may have a proximity sensor associated with each antenna or antenna panel to determine the separation of the antenna or antenna panel from human tissue and modulate the maximum Equivalent Isotropically Radiated Power (EIRP), where EIRP is the product of transmitter power and the antenna gain in a given direction relative to an isotropic antenna of a radio transmitter.

As an example, a UE may have a 4×1 antenna array that exhibits an EIRP of 34 dBm-23 dBm maximum PA output power and 11 dB array gain. The UE may be configured to implement PBO when a user is less than 14 cm away from the array. When the user is almost touching the array, for example there is a 2 mm separation between the user and array, then the maximum EIRP for MPE compliance may be 10 dBm, meaning that the power needs to be backed off by 24 dB.

Figure 4:
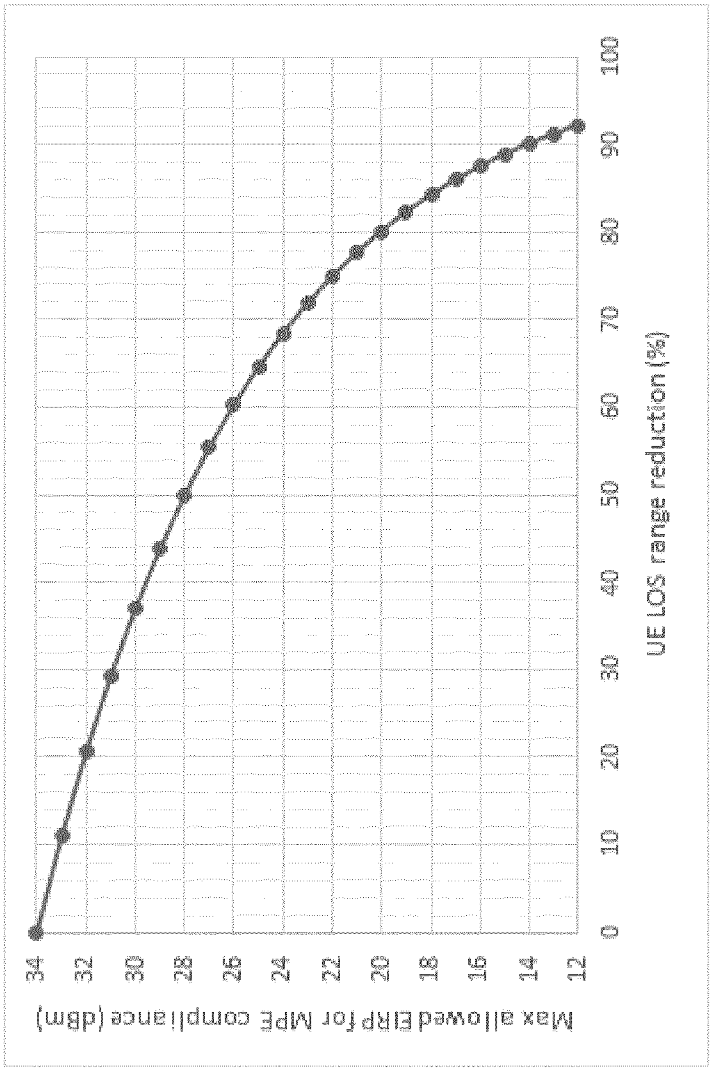
FIG. 4 shows an example of UE line-of-sight range reduction against maximum allowed EIRP.

However, the range of the UE is dependent on the transmission power of the UE antenna. Thus, as PBO is implemented, the UE's effective range decreases. FIG. 4 shows an example of UE line-of-sight range reduction against maximum allowed EIRP, and shows that a 20 dB PBO (decreasing from 34 dBm to 14 dBm) results in a UE range reduction of up to 90%.

Implementing PBO throttles transmit power of UEs that are in power limitation scenarios or close to it, such as cell edge UEs and non-line-of-sight (NLOS) scenarios. As a result, the power received by the access node (e.g. gNB) and the signal to interference plus noise ratio (SINR) is reduced.

Returning to the example of FIG. 4, a UE with a 4×1 array operating with maximum PA at EIRP 34 dBm may have to limit the maximum EIRP to 10 dBm for a full uplink duty cycle when the user touches the array. That is to say, if all the resource blocks are allocated for uplink transmission, then the maximum power per uplink resource block is 10 dBm, such that the EIRP averages out at 10 dBm for the full cycle.

Assuming that the UE uplink/downlink scheduling is equally split, then the UE may be able to transmit uplink at around 13 dBm rather than 10 dBm, as 50% of the resource blocks in the cycle are transmitting uplink at 13 dBm, and 50% of the resource blocks in the cycle are receiving downlink, so no uplink transmission is occurring. A 3 dBm increase is roughly double the power, and the EIRP averages out at 10 dBm over the full cycle.

When a MPE event is determined at the UE, the UE may apply power management—maximum power reduction (P-MPR) and send PHR including P-MPR information to the network. As used herein, an MPE event is triggered by the detection of the proximity of human tissue to the transmitter. The MPE on a serving link may be reported in a single entry PHR for a single link, or a multi-entry PHR with information identifying the cell to which the MPE relates.

According to Rel-16 TS 38.133, Table 10.1.26.1-1, four reported values may be used to indicate a measured P-MPR values as follows:

| Reported value | Measured quantity value | Unit |
|---|---|---|
| P-MPR_00 | 3 ≤ PMP-R < 6 | dB |
| P-MPR_01 | 6 ≤ PMP-R < 9 | dB |
| P-MPR_02 | 9 ≤ PMP-R < 12 | dB |
| P-MPR_03 | PMP-R ≥ 12 | dB |

When a UE is performing power sharing, for example when in DC mode or performing DAPS handover, the UE may allocate power to each of the cells. The UE may have to ensure that the appropriate uplink power is allocated based on the conditions for each cell.

When the UE determines an MPE event, the UE may determine that the allocated uplink power is to be decreased. If the MPE event is associated with only one antenna or antenna panel, or one or more beams emitted by an antenna or antenna panel (e.g. the antenna or panel communicating with the source or target cell), the uplink power on that antenna or antenna panel may be decreased, leading to possible degradation in communication performance on one of the cells that the UE is connected to via the antenna or antenna panel. The UE may experience radio link failure, handover failure, or throughput loss, even though there is still remaining power budget available.

Conventionally the UE may be incapable of dynamic power sharing between two cell groups when performing DC or DAPS. Instead, the UE may allocate power to each group semi-statically, such that the sum power of the configured maximum for each group does not exceed the UE's maximum power capability.

For example, in a so-called semi-static mode, the UE may be configured via RRC signalling with separate power values p-DAPS-Source-r16 and p-DAPS-Target-r16 for DAPS, and/or p-mcg and p-scg for DC. However, the following recognises that, in such examples, if an MPE event is detected for the antenna or panel used for one of the cells (e.g. for the source or target cell, or for the master/primary or secondary cells), then the UE may have unused output power that could be allocated to the other of the cells.

Taking DAPS as an example to illustrate this, the UE may have a maximum transmit power capacity of 23 dB, and threshold transmit power of 20 dB on both the source and target cells (20 dB+20 dB≈23 dB), and be transmitting on a first panel associated with the source cell at 20 dB and the target cell at 20 dB. If an MPE event is detected on the first panel, the transmit power of the first panel may be reduced to 17 dB to comply with the MPE regulations. The UE would then have 3 dB transmit power capacity spare, which could be allocated to the second panel. However, this may not be possible in the semi-static mode.

In DC in a dynamic mode, the UE may set the transmission power for the second panel to be the lowest of {p-scg, p_total−p-mcg}. Thus the UE may not necessarily use p-scg configured by the network, but instead may modify the transmission power based on the amount of power used by p-mcg.

It may be the case that, in this mode, the UE may still not optimally allocate transmission power. For example, the UE may be set with p-mcg to 20 dBm and p-scg to 20 dBm with a p_total of 23 dBm (as above, 20 dBm+20 dBm~23.01 dBm). The UE may use a first panel for MCG and a second panel for SCG, and an MPE event triggered for one panel would not be relevant for the other one.

If the UE detects MPE event for the panel for SCG the p-scg may be decreased down to 3 dBm. However, the UE may still use p_mcg of "20 dBm" even though it is allowed for UE to use a power of 23 dBm, while respecting the p_total limit of 23 dBm (3 dBm+23 dBm~23.04 dBm, with +/−2 dB tolerance allowed).

Thus it is the case that current power sharing implementations, particularly with reference to DC mode or DAPS handover, may not optimise power allocation for uplink transmission at the UE.

Figure 5:
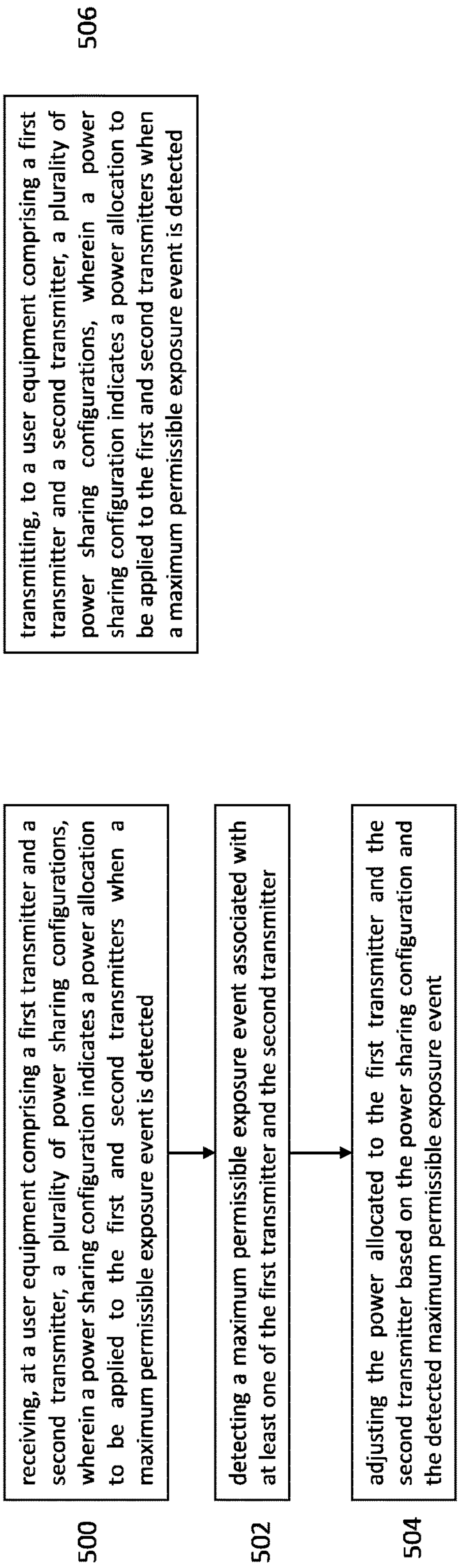
FIG. 5 shows a method according to some examples.

Reference is made to FIG. 5, which shows a method according to some examples. At 500, the method comprises receiving, at a user equipment comprising a first transmitter and a second transmitter, a plurality of power sharing configurations, wherein a power sharing configuration indicates a power allocation to be applied to the first and second transmitters when a maximum permissible exposure event is detected.

At 502, the method comprises detecting a maximum permissible exposure event associated with at least one of the first transmitter and the second transmitter.

At 504, the method comprises adjusting the power allocated to the first transmitter and the second transmitter based on the power sharing configuration and the detected maximum permissible exposure event.

The method of steps 500-504 may be performed at a user equipment.

At 506, the method comprises transmitting, to a user equipment comprising a first transmitter and a second transmitter, a plurality of power sharing configurations, wherein a power sharing configuration indicates a power allocation to be applied to the first and second transmitters when a maximum permissible exposure event is detected.

The method of step 506 may be performed by a network entity, such as but not limited to a gNB.

In some examples, the network may configure the UE with a plurality of power sharing configurations. The power sharing configurations may be applied by the UE in different conditions.

For example, two links may be served from two different transmitters at the UE. Each transmitter may be an antenna, antenna array, or antenna panel. The UE may be configured with a different level mapping to P_MPR at table 10.1.26.1-1 of TS 38.133 of MPE event detection, or different P-MPR value, for each panel.

For instance, an MPE level 1 event detection may be detected at a first panel serving a source cell, and no MPE event detected at a second panel serving a target cell. The UE is initially configured with a 20 dBm allocation for both the first panel and the second panel, with a total power limit of 23 dB.

According to the power sharing configurations and the detected MPE level events detected, the UE may allocate up to 2 dB higher transmission power to the second panel serving the target cell while reducing the transmission power allocated to the first panel by 3 dB, which respect the total power limit of 23 dB.

In another example, a MPE level 2 event may be detected at the first panel serving the source cell, and no MPE event detected at the second panel serving the target cell. The UE may, based on the power sharing configurations, reduce the power allocated to the first panel by 6 dBm and increase the power allocated to the second panel by 3 dB.

In some examples, the power sharing configurations may be differences in p-scg and p-mcg limits for DC and p-source and p-target limits for DAPS for each MPE level event detection. As an example, for an MPE level 1 event detected on the target cell, the difference for p-source may be +2 dB for the first panel in communication with the source cell.

In some examples, the power sharing configurations may cause the UE to decrease the power allocated to a first panel by a first difference value, and increase the power allocated to a second panel by a second difference value in response to detecting an MPE event on the first panel. For example, the power allocated to the first panel (which may be in communication with a source cell or target cell) may be decreased by 3 dB and the power allocated to the second panel (which is in communication with the other of the source cell or target cell) by 2 dB when the UE determines an MPE level 1 event.

In some examples, the UE may adapt the duty cycle in response to detecting an MPE event on one of the panels. For example, a parameter (such as maxUplinkDutyCycle-FR2) may indicate a maximum percentage of symbols during a time period that can be scheduled for uplink transmission so as to ensure compliance with MPE requirements. In some examples, the duty cycle may be adapted according to this parameter.

That is to say, the difference value applied to the transmit power can be adapted to the duty cycle. For example, if in response to determining an MPE event on the first panel, there is 50% duty cycle enforced for the first panel serving the target cell, and the difference value that is applied for the transmit power on the source cell is 3 dB, i.e. p-source (MPE level 1 at only target panel)=p-source(default)+difference (3 dB).

In some examples, the duty cycle may be adapted on both panels. For example, for a MPE level 1 event, a time division multiplexing (TDM) pattern can be allocated to both the antenna or panel in communication with the source and the antenna or panel in communication with the target cell with uplink on non-overlapping slots. This may result in a duty cycle of 50%. The power allocation may not be changed, i.e. the difference value may be set to 0.

For a MPE level 2 event, the TDM pattern can be allocated to both the antenna or panel in communication with the source and the antenna or panel in communication with the target cell with uplink on non-overlapping slots. This may result in a duty cycle of 50%. The power allocation may be adjusted with respect to the duty cycle, such that the power allocation to the antenna or panel communicating with the source cell is reduced by 3 dB and the power allocation to the antenna or panel communicating with the target cell is increased by 2 dB.

Thus, the UE may receive one or more power sharing configurations. When the UE determines that an MPE event occurs, the UE may adjust the power sharing for the antennas or panels serving the source and target cell according to the power sharing configurations.

Table 1 below shows some example power sharing configurations. In this table, it is assumed that the UE has two antennas or panels—one in in communication with the source cell (termed source panel herein) and another in communication with the target cell (termed target panel herein), with an equal share of UE power at the beginning.

In table 1, the first two columns relate to MPE conditions detected at the UE. The first column represents the detection of various different levels of MPE event at the source panel. The second column represents the detection of various different levels of MPE event at the target panel. The third to fifth columns relate to power sharing configurations. The third column represents duty cycling at one or both of the source and target panels. The fourth column represents a power difference applied at the target panel. The fifth column represents the power difference applied to the source panel.

TABLE 1

MPE conditions and power sharing configurations for an initial 50/50 power sharing between target and source panel

| Condition | | Configuration | | |
|---|---|---|---|---|
| MPE at source panel | MPE at target panel | Duty Cycling | Power difference source panel | Power difference target panel |
| No MPE | No MPE | 0% | 0 | 0 |
| No MPE | MPE level 1 | 0% | 2.3 dB | −6 dB |
| No MPE | MPE level 2 | 0% | 2.75 dB | −9 dB |
| No MPE | MPE level 3 | 0% | 3 dB | −12 dB |
| No MPE | MPE level 4 | 0% | 3 dB | −15 dB (reported in PHR) |
| No MPE | MPE level 1 | 25% at target | 0 | 0 |
| No MPE | MPE level 2 | 25% at target | 1.8 dB | −3 dB |
| No MPE | MPE level 3 | 25% at target | 2.3 dB | −6 dB |
| No MPE | MPE level 4 | 25% at target | 2.75 dB | −9 dB (reported in PHR) |
| MPE level 1 | MPE level 1 | 25% at both | 0 | 0 |
| MPE level 1 | MPE level 2 | 25% at both | 0 | −3 dB |
| MPE level 1 | MPE level 3 | 25% at both | 0 | −6 dB |
| MPE level 1 | MPE level 4 | 25% at both | 0 | −x + 3 dB |
| MPE level 2 | MPE level 2 | 25% at both | −3 dB | −3 dB |

While the examples above relates to a source and target cell (and so to DAPS), it should be understood that the same configurations may also be applied to DC operation, where the source cell is replaced by a primary cell and the target cell is replaced by a secondary cell.

Furthermore, it should be understood that the examples provided above are a symmetric solution, in that the source panel and target panels in the table could be swapped, thereby providing power sharing configurations for different MPE event levels for both the source and target panels.

In some examples where MPE is detected only at a single panel, the power reduction enforced on one panel can be allocated to the other panel, as shown in the second to fifth rows of the above table.

In the examples given in Table 1 above, a power difference may be expressed as "x+n", where n is an integer. For example, in the $13^{th}$ entry in the table, the power difference at the target panel is given as "−x+3 dB". In this case, x may be a value of the PMP-R reported in the PHR.

Where an MPE event is detected at a single panel, but the panel enforces duty cycling of 50%, the other panel may be allocated the same power, minus 3 dB. For instance, with an MPE level 1 event detection at the source panel, the target panel has no power delta. With a MPE level 2 event detection at the source panel, the target panel applies −3 dB power difference.

In some examples, where duty cycling is not sufficient to achieve satisfactory uplink power reduction for a given MPE event, the UE may further decrease the maximum uplink power by a certain amount depending on the requirements.

Table 2 below shows some further example power sharing configurations. Like table 1, in table 2 it is assumed that the UE has a source panel and target panel, however in table 2 there is an initial power sharing of 34% of the UE's uplink power for the target panel and 66% of the UE's uplink power for the source panel. The columns in table 2 represent the same parameters as those for table 1.

TABLE 2

MPE conditions and power sharing configurations for an initial 34/66 power sharing between target and source panel

| Condition | | Configuration | | |
|---|---|---|---|---|
| MPE at source panel | MPE at target panel | Duty Cycling | Power delta source panel | Power delta target panel |
| No MPE | No MPE | 0% | 0 | 0 |
| No MPE | MPE level 1 | 0% | 4 dB | −6 dB |
| No MPE | MPE level 2 | 0% | 4.4 dB | −9 dB |
| No MPE | MPE level 3 | 0% | 4.6 dB | −12 dB |
| No MPE | MPE level 4 | 0% | 4.6 dB | −15 dB (reported in PHR) |
| No MPE | MPE level 1 | 25% at target | 0 | 0 |
| No MPE | MPE level 2 | 25% at target | 3 dB | −3 dB |
| No MPE | MPE level 3 | 25% at target | 4 dB | −6 dB |
| No MPE | MPE level 4 | 25% at target | 4.4 dB | −9 dB (reported in PHR) |
| MPE level 1 | MPE level 1 | 25% at both | 0 | 0 |
| MPE level 1 | MPE level 2 | 25% at both | 0 | −3 dB |
| MPE level 1 | MPE level 3 | 25% at both | 0 | −6 dB |
| MPE level 1 | MPE level 4 | 25% at both | 0 | −x + 3 dB |
| MPE level 2 | MPE level 2 | 25% at both | −3 dB | −3 dB |

In the examples of table 2, the initial power allocation between the source panel and target panel is not equal. This may allow for greater adjustment of the power allocated to the panels.

For example, in the case of an MPE level 1 event at the target panel and no MPE event at the source panel, under the allocation from table 1 where the initial power sharing is split 50/50 between source and target panel, the source panel power is increased by 2.3 dB. Whereas for the same MPE event, under the allocation from table 2 where the initial power sharing is split 34/66, the source power panel is increased by 4 dB.

In some examples, the duty cycling may be applied on top of the assigned TDM pattern of the UE. For example, if the UE has 2 uplink slots for the target panel and 8 uplink slots for the source panel, then with duty cycling of 50% for both panels results in the UE having 1 uplink slot for the target panel and 4 uplink slots for the source panel.

In some examples, the UE may have an uneven number of slots. The UE may perform the duty cycling on a symbol level rather than just at the slot level. If the UE is allocated a different number of uplink symbols in uplink slots or flexible slots, the UE may perform the duty cycling according to an absolute number of total uplink symbols.

As shown in tables 1 and 2, in some examples where an MPE event is determined on both panels, no additional uplink power may be allocated. Instead, the amount of power reduction applied to each panel may be different, and may further be adjusted with respect to the duty cycling.

In some examples, the UE may determine that the MPE condition of at least one of the panels has changed. The UE may then re-evaluate the power sharing condition, and adjust the power sharing accordingly.

It should be understood that the values provided herein relating to the examples are given as illustrative examples only, and should in no way be considered limiting. That is to say, for example, different duty cycling or power adjustments may be used than those explicitly provided above.

Thus, a method is provided where the power allocated to a transmitter may be adjusted.

Advantageously, the UE can allocate the maximum transmission power possible to the transmitters according to the detected MPE event. This may improve system robustness and throughput maximization under an MPE event. When the power allocation to one of the transmitters is decreased, the power allocated to another transmitter is not reduced, and in some cases, the power allocated to the other transmitter may be increased. As such, the effective range of the UE using the other transmitter may either be maintained or even increased. For example, the range of a small cell used as a secondary node may be increased by approximately 15% by utilising around 2 dB more power.

In some examples, there is provided an apparatus comprising means for receiving, at a user equipment comprising a first transmitter and a second transmitter, a plurality of power sharing configurations, wherein a power sharing configuration indicates a power allocation to be applied to the first and second transmitters when a maximum permissible exposure event is detected; detecting a maximum permissible exposure event associated with at least one of the first transmitter and the second transmitter; and adjusting the power allocated to the first transmitter and the second transmitter based on the power sharing configuration and the detected maximum permissible exposure event.

In some examples, there is provided an apparatus comprising means for: transmitting, to a user equipment comprising a first transmitter and a second transmitter, a plurality of power sharing configurations, wherein a power sharing configuration indicates a power allocation to be applied to the first and second transmitters when a maximum permissible exposure event is detected.

In some examples, there is provided an apparatus comprising at least one processor and at least one memory including a computer program code, the at least one memory and computer program code configured to, with the at least one processor, cause the apparatus at least to: receive, at a user equipment comprising a first transmitter and a second transmitter, a plurality of power sharing configurations, wherein a power sharing configuration indicates a power allocation to be applied to the first and second transmitters when a maximum permissible exposure event is detected; detect a maximum permissible exposure event associated with at least one of the first transmitter and the second transmitter; and adjust the power allocated to the first transmitter and the second transmitter based on the power sharing configuration and the detected maximum permissible exposure event.

In some examples, there is provided an apparatus comprising at least one processor and at least one memory including a computer program code, the at least one memory and computer program code configured to, with the at least one processor, cause the apparatus at least to: transmit, to a user equipment comprising a first transmitter and a second transmitter, a plurality of power sharing configurations, wherein a power sharing configuration indicates a power allocation to be applied to the first and second transmitters when a maximum permissible exposure event is detected.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory including a computer program code, the at least one memory and computer program code configured to, with the at least one processor, cause the apparatus at least to:

receive, at a user equipment comprising a first transmitter and a second transmitter, a plurality of power sharing configurations, wherein there are a plurality of maximum permissible exposure event levels, and wherein each power sharing configuration of the plurality of power sharing configurations is associated with a respective maximum permissible exposure event level of the plurality of maximum permissible exposure event levels, and wherein each power sharing configuration comprises: a first power difference value indicating an amount to decrease the power allocated to a transmitter with which a maximum permissible exposure event is associated when the maximum permissible exposure event is detected; a second power difference value indicating an amount to increase the power allocated to at least one transmitter with which the maximum permissible exposure event is not associated when the maximum permissible exposure event is detected; and a power allocation to be applied to the first and second transmitters when a maximum permissible exposure event at the respective maximum permissible exposure event level is detected;

detect a maximum permissible exposure event at a maximum permissible exposure event level of the plurality of maximum permissible exposure event levels, the maximum permissible exposure event being associated with at least one of the first transmitter and the second transmitter; and adjust the power allocated to the first transmitter and the second transmitter based on the power sharing configuration corresponding to the detected maximum permissible exposure event level and the detected maximum permissible exposure event, wherein adjusting comprises decreasing the power allocated to the transmitter with which the maximum permissible exposure event is associated based on the first power difference value and increasing the power allocated to at least one transmitter with which the maximum permissible exposure event is not associated based on the second power difference value.

2. The apparatus of claim 1, wherein the first power difference value is at least partially based on a duty cycle of the transmitter with which the maximum permissible exposure event is associated when the maximum permissible exposure event is detected.

3. The apparatus of claim 1, wherein adjusting the power allocated comprises adjusting a duty cycle of the transmitter with which the maximum permissible exposure event is associated.

4. The apparatus of claim 1, wherein adjusting the power allocated comprises adjusting a duty cycle of at least one transmitter with which the maximum permissible exposure event is not associated.

5. The apparatus of claim 1, wherein the user equipment has a maximum power threshold, and wherein the sum of the power allocated to the first transmitter and the power allocated to the second transmitter cannot exceed the maximum power threshold.

6. The apparatus of claim 1, wherein the at least one memory and computer program code are configured, with the at least one processor, to cause the apparatus further to:

receive an updated power sharing configuration; and re-adjust the power allocated to the first transmitter and the second transmitter based on the updated power sharing configuration.

7. The apparatus of claim 1, wherein the at least one memory and computer program code are configured, with the at least one processor, to cause the apparatus further to:

transmit a power headroom report including power management maximum power reduction information based on the detected maximum permissible exposure event, wherein the power headroom report is a multi-entry power headroom report including information identifying a cell to which the maximum permissible exposure event relates.

8. The apparatus of claim 7, wherein at least one of the first power difference value or the second power difference value is based on a value of the power management maximum power reduction reported in the power headroom report.

9. The apparatus of claim 1, wherein the plurality of power sharing configurations are received via radio resource control signaling from a network node.

10. The apparatus of claim 1, wherein each power sharing configuration further indicates a duty cycle for at least one of the first transmitter and the second transmitter, wherein adjusting the power allocated further comprises applying a time division multiplexing pattern to the first transmitter and the second transmitter with uplink transmissions on non-overlapping slots.

11. The apparatus of claim 10, wherein duty cycling is applied on top of the time division multiplexing pattern such that the number of uplink slots allocated to each of the first transmitter and the second transmitter is reduced according to the duty cycle, and wherein when the user equipment has an uneven number of uplink slots, the duty cycling is performed on a symbol level according to an absolute number of total uplink symbols.

12. The apparatus of claim 11, wherein when the duty cycle is not sufficient to achieve a required uplink power reduction for the detected maximum permissible exposure event, the apparatus is further caused to decrease a maximum uplink power allocated to the transmitter with which the maximum permissible exposure event is associated by an additional amount.

13. The apparatus of claim 1, wherein the user equipment is operating in a dual connectivity mode or performing a dual active protocol stack handover.

14. The apparatus of claim 13, wherein the power sharing configurations are differences in p-scg and p-mcg limits for dual connectivity or differences in p-source and p-target limits for the dual active protocol stack handover for each maximum permissible exposure event level, and wherein the plurality of power sharing configurations comprises an initial power allocation between the first transmitter and the second transmitter that is unequal.

15. The apparatus of claim 1, wherein a maximum permissible exposure event is detected at both the first transmitter and the second transmitter, and wherein no additional uplink power is allocated to either transmitter, and wherein an amount of power reduction applied to the first transmitter is different from an amount of power reduction applied to the second transmitter.

16. The apparatus of claim 1, wherein:

the user equipment is operating in a dual connectivity mode or performing a dual active protocol stack handover, wherein the first transmitter is in communication with a primary cell or source cell and the second transmitter is in communication with a secondary cell or target cell;

the plurality of power sharing configurations are received via radio resource control signaling from a network node;

the power sharing configurations are differences in p-scg and p-mcg limits for dual connectivity or differences in p-source and p-target limits for the dual active protocol stack handover for each maximum permissible exposure event level of the plurality of maximum permissible exposure event levels;

the plurality of power sharing configurations comprises an initial power allocation between the first transmitter and the second transmitter that is unequal;

each power sharing configuration further indicates a duty cycle for at least one of the first transmitter and the second transmitter;

adjusting the power allocated further comprises applying a time division multiplexing pattern to the first transmitter and the second transmitter with uplink transmissions on non-overlapping slots, with duty cycling applied on top of the time division multiplexing pattern;

when the duty cycle is not sufficient to achieve a required uplink power reduction for the detected maximum permissible exposure event, the apparatus is further caused to decrease a maximum uplink power allocated to the transmitter with which the maximum permissible exposure event is associated by an additional amount; and the apparatus is further caused to transmit a multi-entry power headroom report including power management maximum power reduction information based on the detected maximum permissible exposure event, the multi-entry power headroom report including information identifying a cell to which the maximum permissible exposure event relates, and wherein at least one of the first power difference value or the second power difference value is based on a value of the power management maximum power reduction reported in the multi-entry power headroom report.

17. An apparatus comprising at least one processor and at least one memory including a computer program code, the at least one memory and computer program code configured to, with the at least one processor, cause the apparatus at least to:

transmit, to a user equipment comprising a first transmitter and a second transmitter, a plurality of power sharing configurations, wherein there are a plurality of maximum permissible exposure event levels, and wherein each power sharing configuration of the plurality of power sharing configurations is associated with a respective maximum permissible exposure event level of the plurality of maximum permissible exposure event levels, and wherein each power sharing configuration indicates comprises: a first power difference value indicating an amount to decrease the power allocated to a transmitter with which a maximum permissible exposure event is associated when the maximum permissible exposure event is detected; a second power difference value indicating an amount to increase the power allocated to at least one transmitter with which the maximum permissible exposure event is not associated when the maximum permissible exposure event is detected; and a power allocation to be applied to the first and second transmitters when a maximum permissible exposure event at the respective maximum permissible exposure event level is detected.

18. The apparatus of claim 17, wherein the at least one memory and computer program code are configured, with the at least one processor, to cause the apparatus further to:

determine that the user equipment has entered a multi-connectivity mode of operation, where the first transmitter is in communication with a first network node and the second transmitter is in communication with a second network node;

determine whether at least one uplink slot for a network associated with the first transmitter of the user equipment is the same as or overlaps at least one uplink slot for a network associated with the second transmitter of the user equipment;

receive, from the user equipment, a user equipment capability report; and determine the plurality of power sharing configurations, wherein the determining comprises determining the power allocation and associating the maximum permissible exposure event with the power allocation;

wherein the transmitting the plurality of power sharing configurations is performed in response to the determining that the user equipment has entered the multi-connectivity mode of operation, is dependent on the determination of whether the at least one uplink slot is the same as or overlaps, and is based on the user equipment capability report.

19. A method comprising:

receiving, at a user equipment comprising a first transmitter and a second transmitter, a plurality of power sharing configurations, wherein there are a plurality of maximum permissible exposure event levels, and wherein each power sharing configuration of the plurality of power sharing configurations is associated with a respective maximum permissible exposure event level of the plurality of maximum permissible exposure event levels, and wherein each power sharing configuration comprises: a first power difference value indicating an amount to decrease the power allocated to a transmitter with which a maximum permissible exposure event is associated when the maximum permissible exposure event is detected; a second power difference value indicating an amount to increase the power allocated to at least one transmitter with which the maximum permissible exposure event is not associated when the maximum permissible exposure event is detected; and a power allocation to be applied to the first and second transmitters when a maximum permissible exposure event at the respective maximum permissible exposure event level is detected;

detecting a maximum permissible exposure event at a maximum permissible exposure event level of the plurality of maximum permissible exposure event levels, the maximum permissible exposure event being associated with at least one of the first transmitter and the second transmitter; and adjusting the power allocated to the first transmitter and the second transmitter based on the power sharing configuration corresponding to the detected maximum permissible exposure event level and the detected maximum permissible exposure event, wherein adjusting comprises decreasing the power allocated to the transmitter with which the maximum permissible exposure event is associated based on the first power difference value and increasing the power allocated to at least one transmitter with which the maximum permissible exposure event is not associated based on the second power difference value.

* * * * *